US012596422B2

(12) United States Patent
Goh et al.

(10) Patent No.: US 12,596,422 B2
(45) Date of Patent: Apr. 7, 2026

(54) SYSTEM AND METHOD FOR A POWER SUSTAINABILITY KEYBOARD WITH PIEZOELECTRIC ENERGY HARVESTER DEVICE

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 70 days.

(21) Appl. No.: 18/373,779

(22) Filed: Sep. 27, 2023

(65) Prior Publication Data

US 2025/0103124 A1    Mar. 27, 2025

(51) Int. Cl.
| | |
|---|---|
| *G06F 1/3231* | (2019.01) |
| *G06F 1/16* | (2006.01) |
| *G06F 1/3215* | (2019.01) |
| *H02J 50/00* | (2016.01) |

(52) U.S. Cl.
CPC .......... *G06F 1/3231* (2013.01); *G06F 1/1669* (2013.01); *G06F 1/3215* (2013.01); *H02J 50/001* (2020.01)

(58) Field of Classification Search
CPC ..... G06F 1/3231; G06F 1/3215; G06F 1/1669
See application file for complete search history.

(56) References Cited

U.S. PATENT DOCUMENTS

| | | | |
|---|---|---|---|
| 5,911,529 A | 6/1999 | Crisan | |
| 11,079,816 B1 | 8/2021 | North | |
| 2002/0074898 A1* | 6/2002 | Maue ...................... B60R 25/24 |
| | | | 340/693.1 |
| 2003/0047435 A1 | 3/2003 | Lee | |
| 2005/0174322 A1* | 8/2005 | Orr ........................... G06F 1/26 |
| | | | 345/156 |
| 2007/0046634 A1* | 3/2007 | Rice ...................... G06F 3/0231 |
| | | | 345/168 |
| 2009/0267892 A1 | 10/2009 | Faubert | |
| 2012/0274564 A1* | 11/2012 | Cronjaeger ........... G06F 1/3259 |
| | | | 713/323 |

(Continued)

FOREIGN PATENT DOCUMENTS

EP          2112575 A1    10/2009

*Primary Examiner* — Raymond N Phan
(74) *Attorney, Agent, or Firm* — Prol Intellectual Property Law, PLLC; H. Kenneth Prol

(57) ABSTRACT

A wireless keyboard operatively coupled to an information handling system includes a wireless keyboard microcontroller and a wireless keyboard PMU to provide power to the wireless keyboard microcontroller and the wireless keyboard PMU operatively coupled to a battery and an ultracapacitor. The wireless keyboard further including a piezoelectric energy harvester device operatively coupled to the wireless keyboard PMU and placed under a first key formed on the wireless keyboard to charge the ultracapacitor when the key is actuated and a keyboard actuation/engagement agent to, when executed by the wireless keyboard microcontroller, determine the wireless keyboard enters a standby mode and with the wireless keyboard PMU switch a power source to the ultracapacitor when in standby mode.

20 Claims, 6 Drawing Sheets

(56)           References Cited

U.S. PATENT DOCUMENTS

| 2014/0217853 A1 | 8/2014 | Mankowski |
| 2014/0253452 A1* | 9/2014 | Miller ................... G06F 3/0231 |
| | | 345/168 |
| 2015/0103006 A1* | 4/2015 | Hemes ................. G06F 3/0231 |
| | | 345/173 |
| 2016/0049265 A1 | 2/2016 | Bernstein |
| 2016/0065094 A1* | 3/2016 | Jeong ................... H01H 13/705 |
| | | 310/319 |
| 2016/0196935 A1 | 7/2016 | Bernstein |
| 2021/0184602 A1* | 6/2021 | Lee ........................... F03G 7/08 |
| 2022/0115906 A1 | 4/2022 | Deng |
| 2022/0176241 A1 | 6/2022 | Goh |
| 2024/0143062 A1* | 5/2024 | Goh ...................... G06F 3/0231 |

* cited by examiner

500

SYSTEM AND METHOD FOR A POWER SUSTAINABILITY KEYBOARD WITH PIEZOELECTRIC ENERGY HARVESTER DEVICE

FIELD OF THE DISCLOSURE

The present disclosure generally relates to a wireless keyboard. The present disclosure more specifically relates to a wireless keyboard that includes an ultracapacitor that is charged, while the wireless keyboard is not in a standby mode, via a piezoelectric energy harvester.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include any number of wireless peripheral devices including a wireless keyboard used to provide input to and receive output from the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
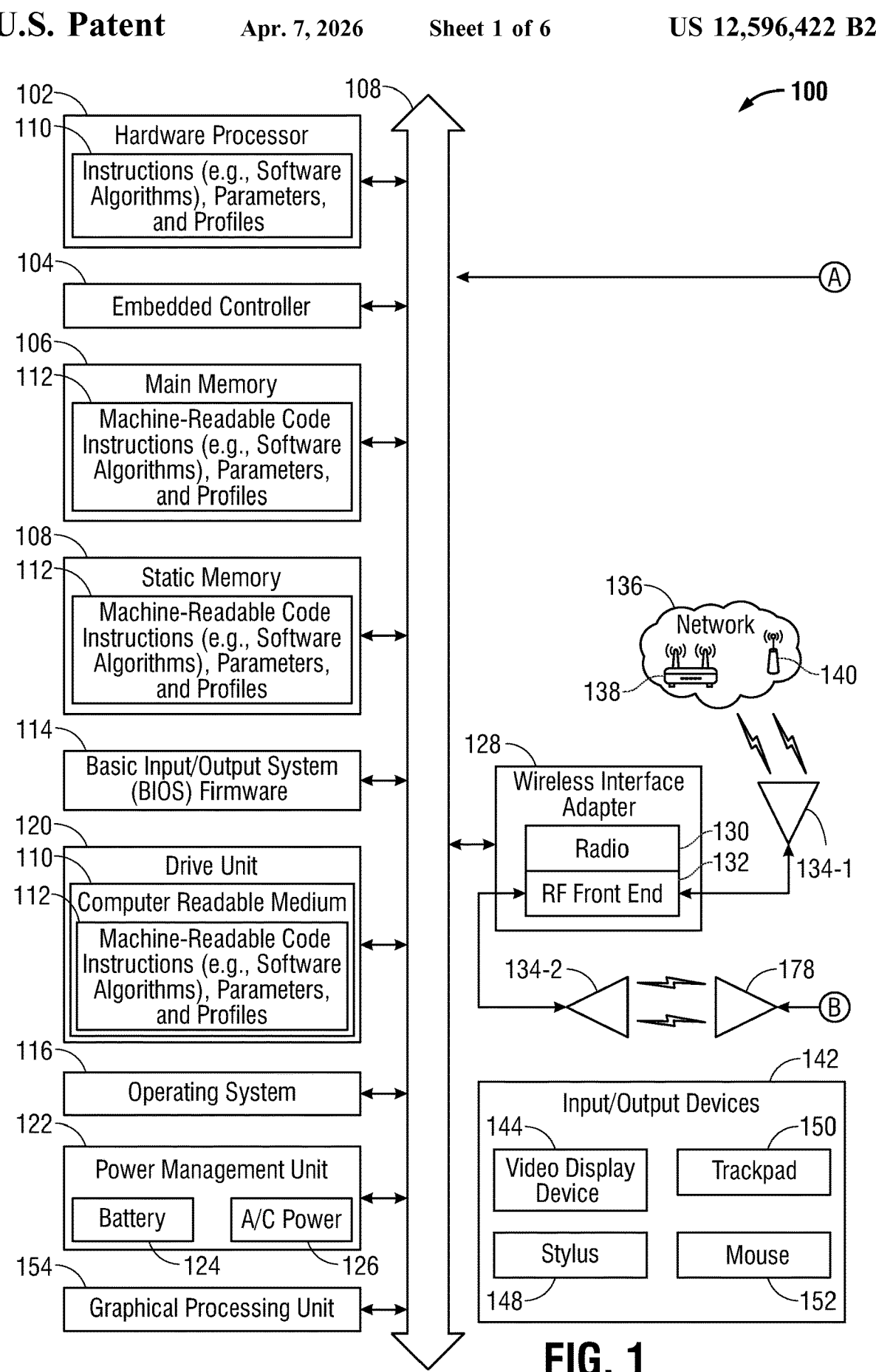
FIG. 1 is a block diagram illustrating an information handling system with a wireless keyboard according to an embodiment of the present disclosure.
Figure 1:
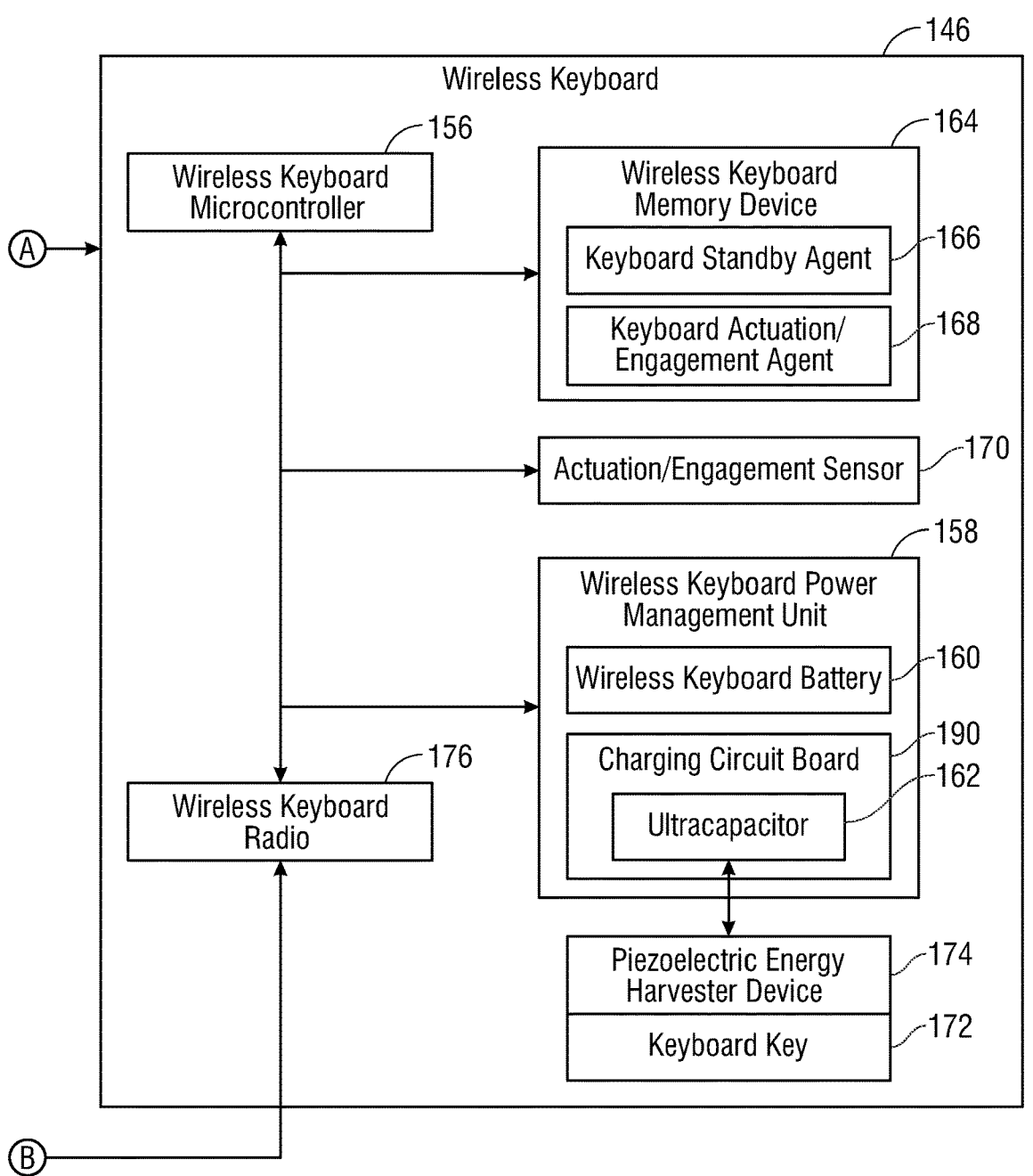

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems include input/output I/O devices that allow a user to interface with the information handling system. Some of these I/O devices may be wireless I/O devices that transceive data to and from the wireless I/O device. Specifically, a wireless keyboard may communicate alphanumeric data to the information handling system as the user actuates one or more keys of the wireless keyboard. However, because the wireless keyboard is continuously communicating with the information handling system 100 regardless of whether input at the wireless keyboard is received from a user, the wireless keyboard will consume power even where a standby mode is activated. The power source is often a battery. However, with the wireless keyboard constantly being powered on even in a standby mode, the battery is drained of power. The cause the user to have to constantly replace the battery. This leads to significant costs associated with battery replacement. Additionally, because the battery has to be replaced, the disposal of the batteries may increase damage to the environment even if they are disposed of properly by the user.

The present specification describes a wireless keyboard operatively coupled to an information handling system that includes a wireless keyboard microcontroller, a wireless keyboard memory device, and a wireless keyboard power management unit (PMU) to provide power to the wireless keyboard microcontroller and wireless keyboard memory device, the wireless keyboard PMU operatively coupled to a battery and an ultracapacitor. The wireless keyboard also includes a piezoelectric energy harvester device operatively coupled to the wireless keyboard PMU and placed under a key formed on the wireless keyboard to charge an ultracapacitor within the wireless keyboard. The actuation of the key on the keyboard where the piezoelectric energy harvester device is located charges the ultracapacitor. In an embodiment, the wireless keyboard further includes a keyboard actuation/engagement agent to, when executed by the wireless keyboard microcontroller, detect when a key on the wireless keyboard is actuated based on input from an actuation/engagement sensor and provide keyboard engagement data to the wireless keyboard microcontroller to switch a power source from the ultracapacitor to the battery.

In an embodiment, the wireless keyboard includes a keyboard actuation/engagement agent to, when executed by the wireless keyboard microcontroller, detect when a key on the wireless keyboard is actuated based on input from an actuation/engagement sensor and provide keyboard engagement data to the wireless keyboard microcontroller to switch a power source from the ultracapacitor to the battery. The execution of the keyboard actuation/engagement agent by a wireless keyboard microcontroller allows the wireless keyboard microcontroller to, with the wireless keyboard PMU, dynamically control whether power is provided to the wireless keyboard via a battery or the ultracapacitor.

In an embodiment, the wireless keyboard includes a keyboard standby agent to, when executed by the wireless keyboard microcontroller, determining when a threshold time period has expired since a user has last actuated a key on the keyboard based on the keyboard engagement data received from the wireless keyboard microcontroller and place the wireless keyboard in a standby mode. The execution of the keyboard standby agent allows the wireless keyboard microcontroller to dynamically, with the wireless keyboard PMU, change from the wireless keyboard being powered by the battery to being powered by the ultracapacitor thereby reducing the power consumption at the battery. This reduces the number of batteries being used to power the wireless keyboard. As a consequence, this reduces batteries that are thrown away and causing environmental issues associated with that disposal. Still further, this reduces the cost of operating the wireless keyboard by the user as well as less batteries are needed over the lifetime of the wireless keyboard.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video, or data communication. For example, an information handling system 100 may be any mobile or other computing device capable of executing a set of instructions (sequential or otherwise)

that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, hardware processor 102, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as the wireless keyboard 146 described herein, a trackpad 150, a mouse 152, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wireless communication with the I/O devices 142 such as the wireless keyboard 146 described herein, a mouse 152, video display device 144, stylus 148, or trackpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 including the wireless keyboard 146 described herein that allow the user to interface with the information handling system 100 via the video/graphics display device 144, such as a cursor control device (e.g., a mouse 152, trackpad 150, or gesture or touch screen input), a stylus 148, and/or the wireless keyboard 146, among others. Various drivers and control electronics may be operatively coupled to operate the I/O devices 142 according to the embodiments described herein. The present specification contemplates that the I/O devices 142 may be wired or wireless. In the context of the wireless keyboard 146 described herein the wireless keyboard 146 is operatively coupled to the information handling system 100 via a wireless connection via a wireless keyboard radio 176 and wireless keyboard antenna 178.

A network interface device of the information handling system 100 shown as wireless interface adapter 128 can provide connectivity among devices such as with Bluetooth® (e.g., 2.4 GHz) or to a network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless Aps 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols. In embodiments described herein, the wireless interface device 128 with its radio 130, RF front end 132 and antenna 134-2 is used to communicate with the wireless keyboard 146 via, for example, a Bluetooth® (e.g., 2.4 GHz) frequency.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device or wireless interface adapter 128.

The information handling system 100 may include a set of instructions 112 that may be executed to cause the computer system to perform any one or more of the methods or computer-based functions disclosed herein. For example, instructions 112 may be executed by a hardware processor 102, GPU 154, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 154, a video/graphic display device 144, or other wired I/O devices 142 such as the stylus 148, a mouse 152, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system is operatively coupled to a wireless keyboard 146. The wireless keyboard 146 may be used by a user to provide input to the information handling system 100 in the form or alphanumeric input for example. As described herein, the wireless keyboard 146 includes a wireless keyboard radio 176 and wireless keyboard antenna 178 that is used to communicate with the information handling system 100 that, in embodiments herein, executes a wireless keyboard driver that allows the communication between the information handling system 100 and the wireless keyboard 146.

The wireless keyboard 146 further includes a wireless keyboard microcontroller 156. The wireless keyboard microcontroller 156 may be any type of processing device that is capable of executing the machine-readable code instructions (e.g., software algorithms), parameters, and profiles such as the keyboard standby agent 166 and keyboard actuation/engagement agent 168 described herein. The wireless keyboard microcontroller 156 may also receive input from, for example, an actuation/engagement sensor 170 used to determine whether a power supply should be switched from a ultracapacitor 162 to wireless keyboard battery 160 or from a wireless keyboard battery 160 to the ultracapacitor 162.

The wireless keyboard 146 further includes a wireless keyboard memory device 164. The wireless keyboard memory device 164 may be used to store computer readable code of the keyboard standby agent 166 and/or keyboard actuation/engagement agent 168 as well as any data used by the wireless keyboard microcontroller 156 to execute the systems and methods described herein.

The wireless keyboard 146 also includes a wireless keyboard PMU 158. The wireless keyboard PMU 158 may include a hardware controller and executable machine-readable code instructions to manage the power provided to the components of the wireless keyboard 146 such as the wireless keyboard microcontroller 156, the actuation/engagement sensor 170, the wireless keyboard memory device 164, and other hardware components described herein. In an embodiment, the wireless keyboard PMU 158 may monitor power levels and be electrically coupled to the wireless keyboard 146 to provide this power. The wireless keyboard PMU 158 may be used, via operation of the wireless keyboard microcontroller 156, to dynamically regulate power from power sources within the wireless keyboard 146 such as the wireless keyboard battery 160 and the ultracapacitor 162 described herein.

The wireless keyboard 146 further includes a piezoelectric energy harvester device 174 operatively coupled to the ultracapacitor 162 such that movement of the piezoelectric energy harvester device 174 creates an electrical charge used to charge the ultracapacitor 162. The wireless keyboard microcontroller 156 and wireless keyboard PMU 158 may coordinate the charging of the ultracapacitor 162 with the piezoelectric energy harvester device 174 as described herein when the user is engaging with the wireless keyboard 146. In an embodiment, the wireless keyboard microcontroller 156 may execute the keyboard standby agent 166 to determine, with the actuation/engagement sensor 170, when a user's presence in front of or user interaction with the wireless keyboard 146. This allows the wireless keyboard microcontroller 156 to determine whether the wireless keyboard 146 is to be placed in a standby mode. When placed in a standby mode, the wireless keyboard 146 may be powered by the ultracapacitor 162 instead of the wireless keyboard battery 160.

In an embodiment, the actuation/engagement sensor 170 may be any sensor that detects the user's presence in front of the wireless keyboard 146 or detect the user interacting with the wireless keyboard 146. By way of example, the actuation/engagement sensor 170 may be a triggering device that detects a user actuating any key or a specific key on the wireless keyboard 146. For example, the actuation/engagement sensor 170 may include a key on a QWERTY-type alphanumeric keyboard of the wireless keyboard 146. In an embodiment, the actuation/engagement sensor 170 may be a sensor that detects a user's interaction with the housing of the wireless keyboard 146 such as a motion detector. In an embodiment, the actuation/engagement sensor 170 may be a proximity sensor that emits an electromagnetic filed or beam of electromagnetic radiation (e.g., infrared light) to detect changed in the field of the beam or field or a return signal bouncing off of an object such as the user.

When the actuation/engagement sensor 170 is triggered, data indicating as such is transmitted to the wireless keyboard microcontroller 156. With this data the wireless keyboard microcontroller 156 may cause the wireless keyboard 146 to exit the standby mode. As a result of exiting the standby mode, the wireless keyboard microcontroller 156, with the wireless keyboard PMU 158, may cause the wireless keyboard 146 to be powered using the wireless keyboard battery 160 instead of the ultracapacitor 162. As described herein, this prevents the wireless keyboard 146 from being powered constantly by a wireless keyboard battery 160 even during standby mode thereby reducing the need to replace the wireless keyboard battery 160. Additionally, while the wireless keyboard 146 is not in standby mode, the ultracapacitor 162 is being charged by actuation of a key under which a piezoelectric energy harvester device 174 has been placed.

In an embodiment, the piezoelectric energy harvester device 174 may include a piezoelectric device that converts mechanical strain into an electric current or voltage. In an embodiment, the piezoelectric energy harvester device 174 may be in the form of a sheet of piezoelectric material diveboard that is coupled, at a distal end of the piezoelectric material diveboard, to a metal contact operatively coupled to the ultracapacitor 162. In an embodiment, a push block may be formed at a distal end of the piezoelectric material diveboard such that the push block is in mechanical contact with an underside of the key 172 formed on the wireless keyboard 146. In an embodiment, the metal contact electrically couples the piezoelectric material diveboard of the piezoelectric energy harvester device 174 to the ultracapacitor 162 via a charging circuit board 190 or other electrical coupling means such as a wire, wire harness, PCB, or the like as described herein. The metal contact may be made of a conductive material that allows the current and voltage generated via the flexing of the structure of the piezoelectric material diveboard to be conducted through the metal contact and charging circuit 190 to the ultracapacitor 162. The wireless keyboard PMU 158 may then utilize the harvested power from the ultracapacitor 162 according to embodiments herein.

During use, as the user presses down on the keyboard key 172, the underside of the keyboard key 172 presses against the push block which forces the piezoelectric material diveboard of the piezoelectric energy harvester device 174 down. Again, this strain on the piezoelectric material diveboard creates a current or voltage that is used to charge the ultracapacitor 162 thereby increasing the available power at the ultracapacitor 162 for the powering of the wireless keyboard 146 when the wireless keyboard 146 has been placed in standby mode. In an embodiment, the keyboard key 172 may be any key formed on the wireless keyboard 146 but may include those keyboard keys 172 that are most often actuated by a user. The most actuated keyboard keys 172 may include a spacebar that is actuated by a user to separate words being typed. Additionally, in an embodiment, because of the development of predictive text being used with word processing software applications, a "tab" key may also be a candidate keyboard key 172 for the piezoelectric energy harvester device 174 to be placed under due to the fact that this key may be used as a signal to accept the predicted text presented to the user during execution of the word processing software application. It is appreciated that any number of keyboard keys 172 formed on the wireless keyboard 146 may include a piezoelectric energy harvester device 174 used to charge the ultracapacitor 162 while the wireless keyboard 146 is not in a standby mode as described herein.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
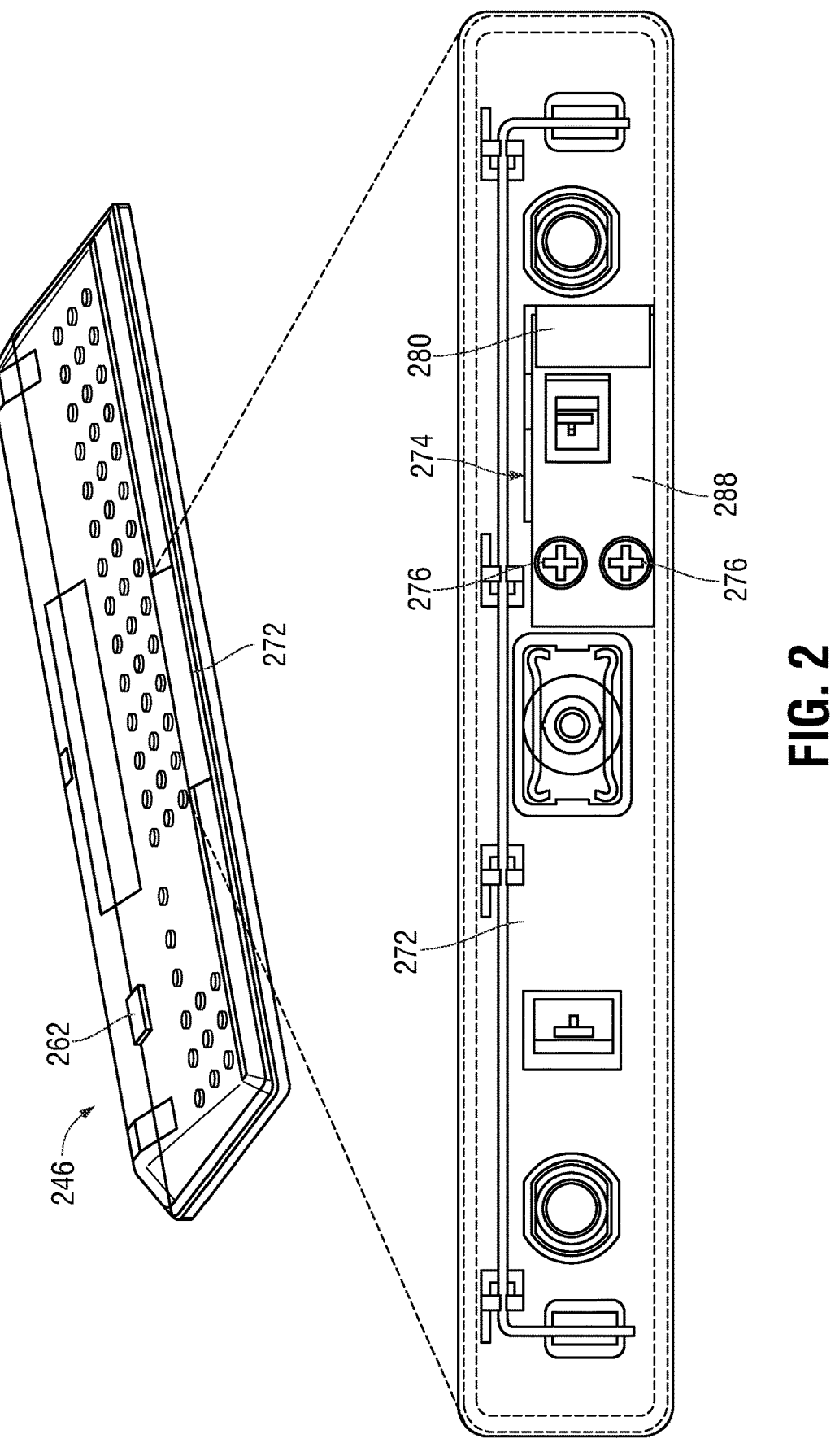
FIG. 2 is a perspective view of a wireless keyboard having an ultracapacitor with an expanded view of a keyboard key with a piezoelectric energy harvester device formed into the wireless keyboard according to an embodiment of the present disclosure.

FIG. 2 is a perspective view of a wireless keyboard having an ultracapacitor 262 with an expanded view of a keyboard key 272 with a piezoelectric energy harvester device 274 formed into the wireless keyboard 246 according to an embodiment of the present disclosure. As described herein, the wireless keyboard 246 includes a number of keyboard keys 272 used by a user to provide input to the information handling system (e.g., 100, FIG. 1). Among these keyboard keys 272 is a space bar used by a user to provide a space between words in a sentence, for example. Because of the relative frequency of a user actuation this space bar, the piezoelectric energy harvester device 274 and push block 280 described herein may be placed under this particular keyboard key 272 in order to charge the ultracapacitor 262 as described herein.

During operation of the wireless keyboard 246, the user may initialize the wireless keyboard 246 by, for example, actuating a power switch. This causes the wireless keyboard microcontroller to be activated and begin the execute computer readable program code of the keyboard standby agent and keyboard actuation/engagement agent as described herein. For example, the keyboard actuation/engagement agent may be executed to determine if a user has actuated any keyboard key 272 on the wireless keyboard 246 or is otherwise engaging with the wireless keyboard 246. For example, the keyboard actuation/engagement agent may determine whether any keyboard key 272 has been actuated on the wireless keyboard 246 within a period of time. Where a keyboard key 272 has been actuated within a threshold period of time, the keyboard actuation/engagement agent may indicate that by providing input data to the wireless keyboard microcontroller and, where necessary, restart a counter that is used to determine whether the threshold period of time has been reached. Additionally, or alternatively, the keyboard actuation/engagement agent may be operatively coupled to an actuation/engagement sensor that detects the user's presence or movement of the wireless keyboard 246. Thus, in certain embodiments, the actuation/engagement sensor may be a motion sensor (e.g., IR sensor) or a motion sensor that detects this user interaction or engagement with the wireless keyboard 246. Again, when the keyboard actuation/engagement agent determines that, via the actuation/engagement sensor, the user is engaging with the wireless keyboard 246, this engagement data is sent to the wireless keyboard microcontroller that, where necessary, restarts the counter that is used to determine whether the threshold period of time has been reached.

In those instances where the threshold period of time has been determined to have been reached by the wireless keyboard microcontroller, the wireless keyboard microcontroller may execute a keyboard standby agent that places the wireless keyboard 246 in a standby mode. This standby mode may be any type of sleep mode that is a lower power mode for the wireless keyboard 246. The standby mode saves a significant amount of energy but still consumes energy such as via operation of a wireless radio to monitor communications or ping a host information handling system. In typical wireless keyboards 246 this still means that power from the wireless keyboard battery is still being drawn thereby, eventually, draining the wireless keyboard battery and requiring the user to replace the wireless keyboard battery more frequently. However, by execution of the keyboard standby agent by the wireless keyboard microcontroller, the wireless keyboard microcontroller may further coordinate with the wireless keyboard PMU to switch the power source from the wireless keyboard battery to the ultracapacitor 262 described herein. Because the ultracapacitor 262 had been charged via actuation of the keyboard key 272 by the user and movement of a piezoelectric portion of the piezoelectric energy harvester device 274, the ultracapacitor 262 acts as a secondary power source to be used to power the wireless keyboard 246 during the lower power consuming state of the standby mode. The piezoelectric portion of the piezoelectric energy harvester device 274 may be a piezoelectric material diveboard 288 fastened with one or more fasteners 276 at a proximal end of the piezoelectric material diveboard 288. A push block 280 is coupled at a distal end of the piezoelectric material diveboard 288. Thus, during operation of the piezoelectric energy harvester device 274, a user may actuate the key 272 (e.g., a space bar) which contacts the push block 280 which, in turn, flexes or bends the piezoelectric material diveboard 288 downward thereby creating a current and voltage at the piezoelectric energy harvester device 274.

As show in FIG. 2, the keyboard key 272 includes the piezoelectric energy harvester device 274 formed thereunder so that the piezoelectric energy harvester device 274 may be used to charge the ultracapacitor 262 operatively coupled to the piezoelectric energy harvester device 274. During use, the user may press the keyboard key 272 (e.g., a space bar). The actuation of the keyboard key 272 presses down onto a push block 280 operatively coupled to a distal end of the piezoelectric material of the piezoelectric energy harvester device 274. By forcing the piezoelectric energy harvester device 274 down, an electrical current or voltage is created that is relayed to the ultracapacitor 262 via a metal conductor via a printed circuit board (PCB) or any amount of electrical wiring used to electrically couple the piezoelectric energy harvester device 274 to the ultracapacitor 262. In the embodiment shown in FIG. 2, the ultracapacitor 262 is located at a top portion of the wireless keyboard 246 with the piezoelectric energy harvester device 274 located at a lower portion of the wireless keyboard 246 at a space bar. However, it is appreciated that the physical location of the ultracapacitor 262 and the piezoelectric energy harvester device 274 may be different than that shown, and the present specification contemplates that the location of the ultracapacitor 262 and the number and arrangement of the piezoelectric energy harvesters 274 under the keyboard keys 272 may be different than those shown in FIG. 2.

Figure 3:
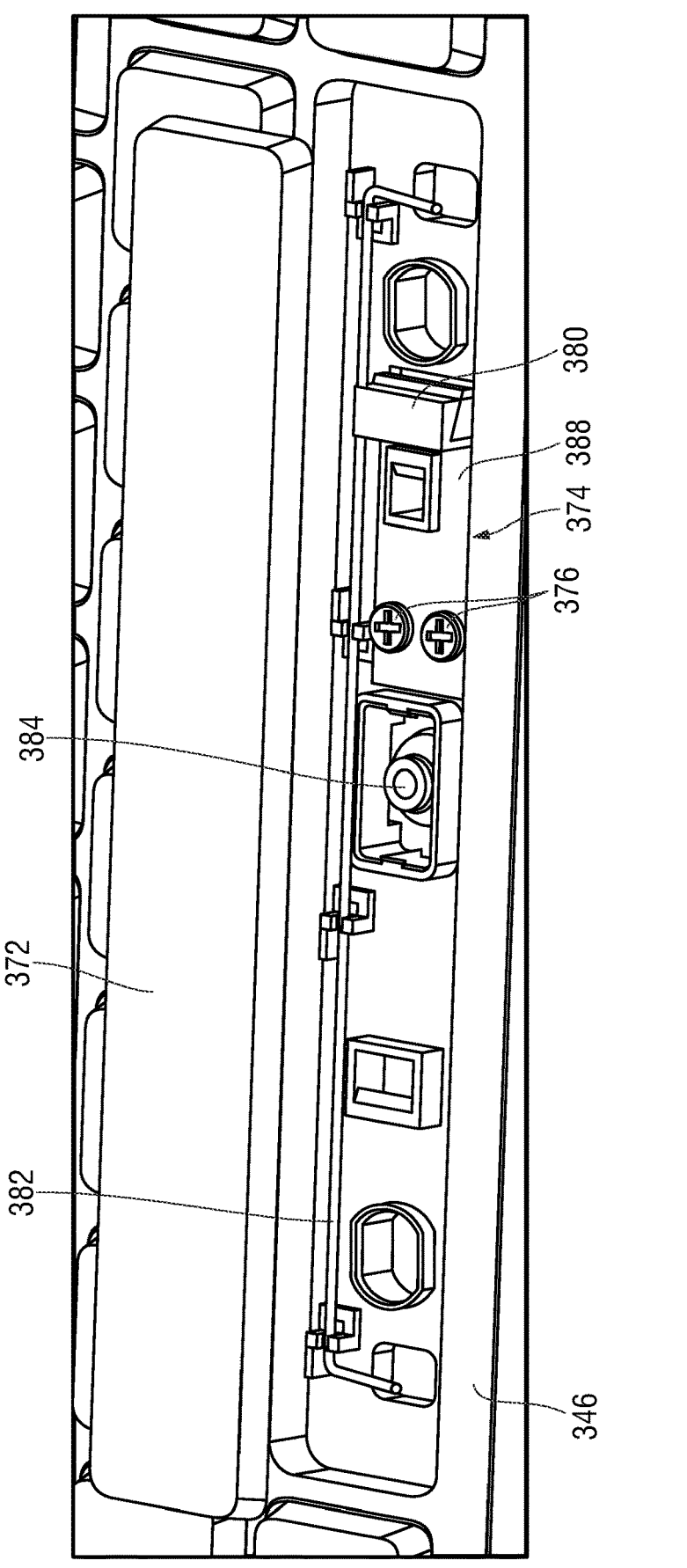
FIG. 3 is a perspective view of a keyboard key of a wireless keyboard with a piezoelectric energy harvester device formed thereunder according to an embodiment of the present disclosure.

FIG. 3 is a perspective view of a keyboard key 372 of a wireless keyboard 346 with a piezoelectric energy harvester device 374 formed thereunder according to an embodiment of the present disclosure. As described herein, the keyboard key 372 may include a space bar formed on the wireless keyboard 346. However, the present specification contemplates that other keyboard keys 372 different or in addition to may be paired with a piezoelectric energy harvester device 374 used to charge an ultracapacitor when the wireless keyboard 346 is not in a standby mode.

The keyboard key 372 in FIG. 3 has been removed away from the piezoelectric energy harvester device 374 in FIG. 3 to show a placement of the piezoelectric energy harvester device 374 relative to the keyboard key 372. As described herein, the push block 380 has been coupled to a distal end of the piezoelectric material diveboard 388 or other piezoelectric material structure of the piezoelectric energy harvester device 374 such that when a user forces the keyboard key 372 downward (e.g., actuates the keyboard key 372), the push block 380 forces this distal end of the piezoelectric material diveboard 388 or other piezoelectric material structure of the piezoelectric energy harvester device 374 downward to flex, distend, or bend thereby distorting the piezoelectric material diveboard 388 or other piezoelectric material structure. This creates the electrical current and voltage at the piezoelectric energy harvester device 374. This electrical current and voltage is passed through a metal contact formed in a PCB or wiring located under the piezoelectric material diveboard 388 of the piezoelectric energy harvester device 374 at a contact at the proximal end of the piezoelectric material diveboard 388 or other piezoelectric material structure.

The keyboard key 372 also includes a rubber dome 384 with key switches and a key push bar 382. The rubber dome 384 may be used to push the keyboard key 372 back up after the user has actuated the keyboard key 372. The key push bar 382 is used in larger keys on the wireless keyboard such as space bar key as keyboard key 372 to stabilize the key 372 when pressed to it depresses and returns uniformly across the length of the larger keyboard key 372. A spring may be operatively coupled to the key push bar 382 so that an upward force may be placed along the length of the keyboard key 372 so that, once the force from the user is released, the keyboard key 372 is returned upward. This also causes the keyboard key 372 to return to its unactuated position with the piezoelectric material diveboard 388 of the piezoelectric energy harvester device 374 being returned to its unflexed orientation due to the push block 380 not forcing or distending the piezoelectric material diveboard 388 or other piezoelectric material structure downward.

The keyboard key 372 includes a rubber dome 384. The rubber dome 384 includes a contact pad material formed thereunder to contact with a contact pad as a key switch for the keyboard key 372. Therefore, as the rubber dome 384 is pressed down by the actuation of the keyboard key 372 by the user, this contact pad material (e.g., metal layer formed under the rubber dome 384) may contact a contact pad formed on a contact pad layer. This contact causes a signal to be sent to the wireless keyboard microcontroller indicative of the keyboard key 372 having been actuated. This causes this input to be sent to the information handling system via the wireless keyboard radio as described herein.

Figures 4A, 4B:
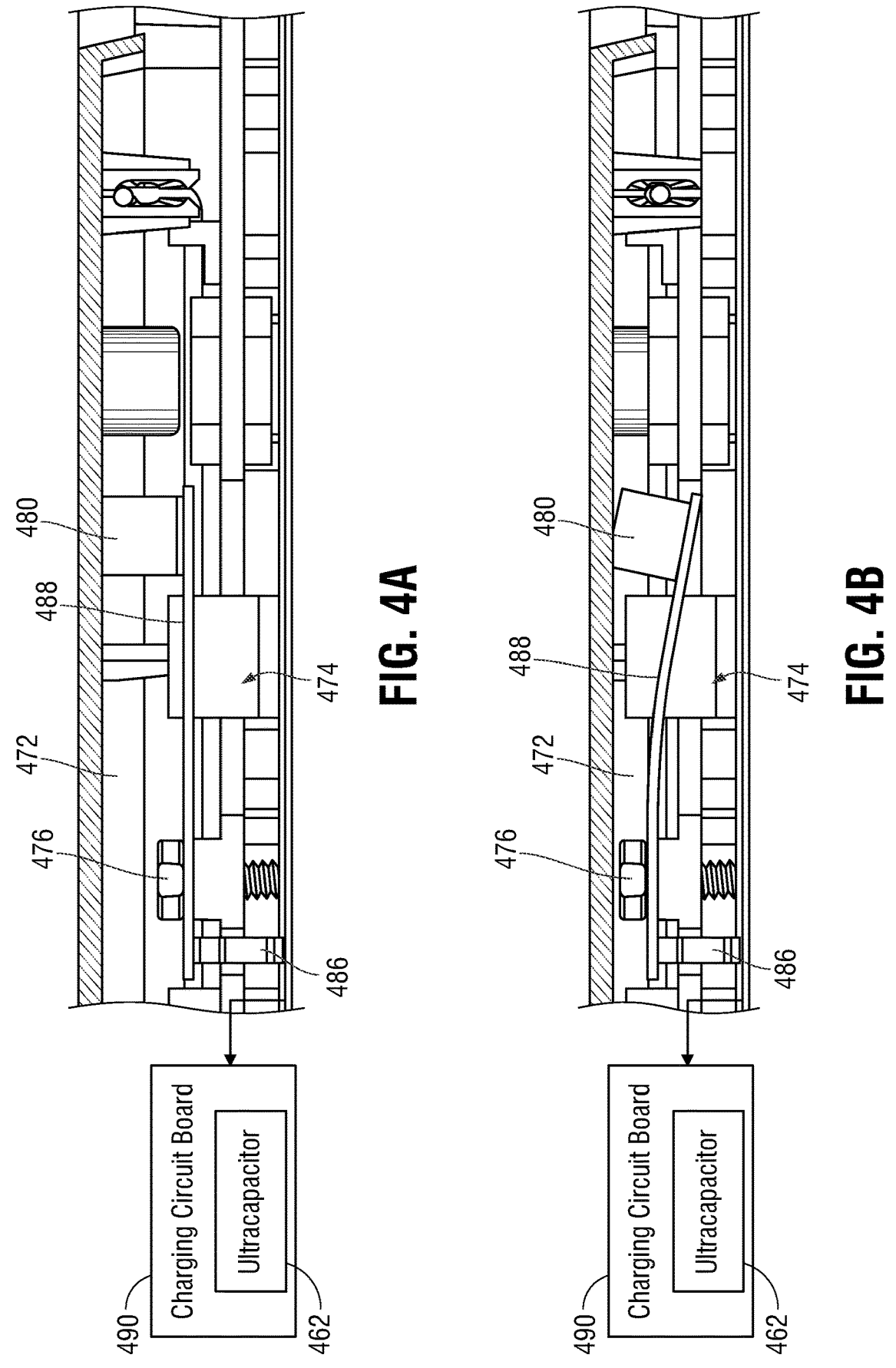
FIG. 4A is a side, cross-sectional view of a piezoelectric energy harvester device formed under a keyboard key in a wireless keyboard according to another embodiment of the present disclosure.
FIG. 4B is a side, cross-sectional view of a piezoelectric energy harvester device formed under a keyboard key in a wireless keyboard according to another embodiment of the present disclosure.

FIG. 4A is a side, cross-sectional view of a piezoelectric energy harvester device 474 formed under a keyboard key 472 in a wireless keyboard according to another embodiment of the present disclosure. FIG. 4B is also a side, cross-sectional view of a piezoelectric energy harvester device 474 formed under a keyboard key 472 in a wireless keyboard according to another embodiment of the present disclosure. FIG. 4A shows the piezoelectric material diveboard 488 or other piezoelectric material structure of the piezoelectric energy harvester device 474 in an unbent or unflexed state while FIG. 4B shows the piezoelectric material diveboard 488 or other piezoelectric material structure in a bent or flexed state.

As described herein, the push block 480 is operatively coupled to a distal end of the piezoelectric material diveboard 488 or other piezoelectric material structure. In an embodiment, the push block 480 may be coupled to the distal end of the piezoelectric material diveboard 488 or other piezoelectric material structure via an adhesive for example. The push block 480 is interfacing with the underside surface of the keyboard key 472 such that as the keyboard key 472 is forced down via actuation by the user, the push block 480 is also forced down as depicted in FIG.

4B. The other end of the piezoelectric material diveboard 488 (e.g., the proximal end) or other piezoelectric material structure is operatively coupled or affixed to the wireless keyboard. In an embodiment, the structure of the piezoelectric material diveboard 488 is affixed via a fastener 476, such as screw or a plurality of screws. A hook, latch, interference fit, adhesive, or other fastener may be used in other embodiments.

The proximal end of the piezoelectric material diveboard 488 or other piezoelectric material structure is also operatively coupled to a metal contact 486. This metal contact 486 electrically couples the piezoelectric material diveboard 488 or other piezoelectric material structure of the piezoelectric energy harvester device 474 to the ultracapacitor 462 via a charging circuit board 490 or other electrical coupling means such as a wire, wire harness, PCB, or the like as described herein. The metal contact 486 may be made of a conductive material that allows the current and voltage generated via the flexing of the structure of the piezoelectric material diveboard 488 or other piezoelectric material structure to be conducted through the metal contact 486 and charging circuit 490 to the ultracapacitor 462. The PMU (not shown) may then utilize the harvested power from the ultracapacitor 462 according to embodiments herein.

Figure 5:
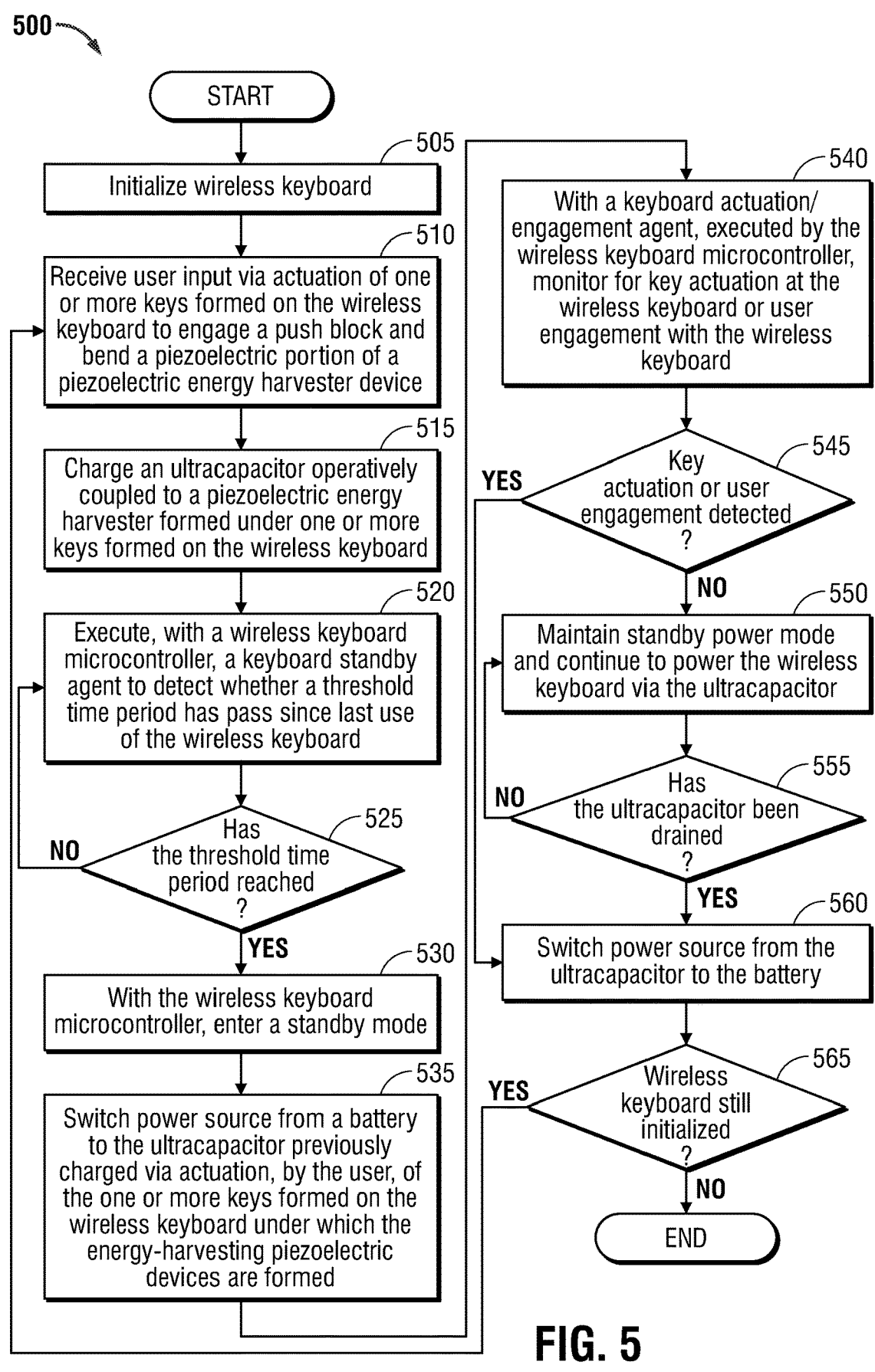
FIG. 5 is a flow diagram illustrating a method of operating a wireless keyboard operatively coupled to an information handling system according to an embodiment of the present disclosure.

FIG. 5 is a flow diagram illustrating a method 500 of operating a wireless keyboard operatively coupled to an information handling system according to an embodiment of the present disclosure. As described herein, the wireless keyboard includes at least one piezoelectric energy harvester device formed under at least one keyboard key of the wireless keyboard. The wireless keyboard has an ultracapacitor as described herein that may be charged by multiple piezoelectric energy harvester devices placed under multiple keyboard keys in some embodiments and used by a PMU to supplement power needs of the wireless keyboard.

The method 500 may include, at block 505, initializing the wireless keyboard. As described herein, the initialization of the wireless keyboard may include a user actuating a power button or switch to cause power to be provided to, at least, the wireless keyboard microcontroller. A PMU may access a power source, such as a battery, to power components of the wireless keyboard including the wireless keyboard microcontroller and a wireless keyboard radio system.

At block 510, the method 500 further includes receiving user input at the wireless keyboard via actuation of one or more keys formed on the wireless keyboard. The wireless keyboard may be any type of keyboard including a QWERTY-type keyboard that allows a user to provide input to an information handling system. Because the wireless keyboard is wirelessly coupled to the information handling system, the wireless keyboard includes a wireless keyboard radio and wireless keyboard antenna to transceive this input data to the information handling system.

As described herein, where a user presses or actuates the keyboard key, the keyboard key engages a push block operatively coupled to a distal end of the structure of the piezoelectric material diveboard. The downward movement of the push block causes the piezoelectric material diveboard or other piezoelectric material structure to be flexed, bent, or otherwise distorted which generates an electrical charge due to the flexing of the piezoelectric material. This electrical charge is conducted through a metal contact, to a charging circuit board and to the ultracapacitor to charge the ultracapacitor.

The method 500 includes, at block 515, charging the ultracapacitor operatively coupled to the piezoelectric energy harvester device formed under one or more keys formed in the wireless keyboard. As described herein, the piezoelectric energy harvester device includes a piezoelectric material diveboard with a push block operatively coupled to a distal end of the diveboard structure of the piezoelectric material diveboard. The proximal end piezoelectric material diveboard is coupled to a housing of the wireless keyboard via a fastener as well as electrically coupled to a metal contact. The metal contact is operatively coupled to the ultracapacitor, via a charging circuit or wires, such that as the piezoelectric material diveboard structure or other piezoelectric material structure is mechanically flexed due to the user actuating the keyboard key generated charge flows to the ultracapacitor to charge it. With flex of the piezoelectric material diveboard structure, a current and voltage is created. This current and voltage is used to charge the ultracapacitor housed within the housing of the wireless keyboard and is controlled with the charging circuit and monitored by a PMU. It is appreciated that any circuitry, including with the PMU, may be used that facilitates the transmission and regulation of the current and voltage produced by the piezoelectric energy harvester device to the ultracapacitor. The PMU may monitor voltage levels at the ultracapacitor and may control use of the charge in the ultracapacitor to operate the wireless keyboard components such as the wireless keyboard radio, microcontroller, or other components requiring charge.

At block 520, the method 500 includes executing, with a wireless keyboard microcontroller, a keyboard standby agent to detect whether a threshold time period has passed since the wireless keyboard was last used and/or the user had been detected at the wireless keyboard. As described herein, the execution of the keyboard standby agent may include the initiation of a countdown clock that determines whether this threshold time period has passed. Concurrently, the wireless keyboard microcontroller executes a keyboard actuation/engagement agent such that the wireless keyboard microcontroller is notified if and when a user has actuated a key on the wireless keyboard such as with a keypress detector device or has detected, via an actuation/engagement sensor, the user at the wireless keyboard. Where the execution of the keyboard actuation/engagement agent by the wireless keyboard microcontroller indicates actuation of a keyboard key or presence of the user, this countdown clock is reset, and the keyboard standby agent waits for the countdown to be met.

At block 520, therefore, the wireless keyboard microcontroller determines whether the threshold time period has been reached by the countdown being met. Where it has not due to the execution of the keyboard actuation/engagement agent indicating user actuation of a keyboard key or presence of a user, the method 500 returns to block 520 to continue monitoring for user interaction or user presence described herein. However, where the user has walked away from or paused typing the wireless keyboard thereby allowing the threshold time limit to expire at block 525, the method 500 continues to block 530.

At block 530, the wireless keyboard microcontroller causes the wireless keyboard to enter into a standby mode or even a sleep mode that reduces the power consumption of the wireless keyboard. However, the wireless keyboard radio and even the microcontroller may continue to operate to scan or monitor for wireless communications from the information handling system or to be ready to detect a keystroke or user presence. Thus, power is still consumed, but at a lower level. In prior art systems, this may drain the dry cell batteries or rechargeable batteries of the wireless keyboard reducing their lifespan. At block 535, the wireless keyboard microcontroller and PMU may switch power sources from the wireless keyboard battery to the ultracapacitor. Because the ultracapacitor was previously charged via actuation of the keyboard keys, the ultracapacitor has power to power the wireless keyboard for a time while in standby mode. However, depending on the length of time that the wireless keyboard is in standby mode, the ultracapacitor may not be capable of continually powering the wireless keyboard and eventually, the wireless keyboard microcontroller may switch back to operating the wireless keyboard off of the power of the wireless keyboard battery when power has been drained in the ultracapacitor as described herein. Nonetheless, this will prolong the life of the wireless keyboard battery, especially dry cell batteries. In this way, reduction of battery consumption by the wireless keyboard may be realized.

At block 540, the wireless keyboard microcontroller, via execution of the keyboard actuation/engagement agent, may monitor for user actuation of a keyboard key and/or user engagement with the wireless keyboard. As described herein, the execution of the keyboard actuation/engagement agent looks for, at least, two triggering events that will bring the wireless keyboard out of the standby mode. The first triggering event includes an actuation of any keyboard key as detected by a key actuation detector which may be a key switch that is mechanical, capacitive, electrical, resistive, magnetic, or other known in the art. In an embodiment, when input from any keyboard key is received at the wireless keyboard microcontroller, the wireless keyboard microcontroller wakes up and executes the actuation/engagement sensor as described herein. A second triggering event could include, in some embodiments, signals received from an actuation/engagement sensor. In an embodiment, the actuation/engagement sensor is an IR camera, capacitive sensor, or other proximity sensor that detects the presence of the user in front of the wireless keyboard. In another embodiment, the actuation/engagement sensor is a motion sensor that detects bumps or movement of the wireless keyboard. It is appreciated that the wireless keyboard microcontroller, executing the keyboard actuation/engagement agent, may receive input from any of these sensors and/or form any keyboard key in order to trigger the wireless keyboard microcontroller to wake up.

At block 545, therefore, the wireless keyboard microcontroller determines whether keyboard key actuation or user presence has been detected. Where user presence or keyboard key actuation has not been detected, the method moves to block 550 with the wireless keyboard microcontroller being maintained in the standby mode and the PMU continuing to use the ultracapacitor to provide power to the wireless keyboard. However, as described herein, the ultracapacitor itself may run out of power prior to the user reengaging with the wireless keyboard. As such, at block 555, the wireless keyboard microcontroller determines, via the wireless keyboard PMU, whether the available power in the ultracapacitor has been drained or not. If the power in the ultracapacitor has not been drained, the method 500 returns to block 550 with the PMU continuing to use the ultracapacitor as described herein.

Where the power has been drained from the ultracapacitor as determined at block 555 or where the keyboard key actuation or user engagement at the wireless keyboard is detected at block 545, the method 500 proceeds to block 560. At block 560 the wireless keyboard microcontroller, with the wireless keyboard PMU, switches the power source from the ultracapacitor to the wireless keyboard battery. Again, as described herein, by including the ultracapacitor and the piezoelectric energy harvester device within the wireless keyboard, power is conserved at the wireless keyboard battery thereby reducing the frequency at which the user has to replace the wireless keyboard battery. This not only reduces the costs associated with operating the wireless keyboard but also reduces the number of batteries that need to be disposed of or recycled thereby reducing the environmental impact due to the operation of the wireless keyboard.

At block 565, the method 500 includes determining whether the wireless keyboard is still initiated. Where the wireless keyboard is still initiated, the method 500 proceeds to block 510 to perform the methods described herein. Where the wireless keyboard is no longer initiated, the method 500 may end.

The blocks of the flow diagrams of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless keyboard operatively coupled to an information handling system comprising:
   a wireless keyboard microcontroller;
   a wireless keyboard power management unit (PMU) to provide power to the wireless keyboard microcontroller and the wireless keyboard PMU operatively coupled to a battery and an ultracapacitor, wherein the wireless keyboard PMU switches between the battery and the ultracapacitor to power the wireless keyboard;
   a piezoelectric energy harvester device operatively coupled to the wireless keyboard PMU and placed under a first key formed on the wireless keyboard to charge the ultracapacitor when the key is actuated; and
   a keyboard actuation/engagement agent to, when executed by the wireless keyboard microcontroller, determine when the wireless keyboard enters a standby mode and, with the wireless keyboard PMU, to switch a power source for the wireless keyboard to the ultracapacitor from the battery when in standby mode.

2. The information handling system of claim 1 further comprising:
   a keyboard standby agent to, when executed by the wireless keyboard microcontroller, determine when a threshold time period has expired since a user has last actuated any key on the keyboard based on keyboard engagement data received by the keyboard actuation/engagement agent from the wireless keyboard microcontroller to place the wireless keyboard in a standby mode.

3. The information handling system of claim 1, wherein the first key is the space key on the wireless keyboard.

4. The information handling system of claim 1 further comprising:
   a proximity sensor formed in a housing of the wireless keyboard operatively coupled to keyboard actuation/engagement agent to detect the presence of the user of the keyboard to determine keyboard engagement data provided to the wireless keyboard microcontroller.

5. The information handling system of claim 1, wherein the piezoelectric energy harvester device formed under the first key includes a piezoelectric diveboard structure that flexes with actuation of the first key to cause a charge to be provided at the ultracapacitor to charge the ultracapacitor.

6. The information handling system of claim 1 further comprising:
   the wireless keyboard microcontroller to, via the wireless keyboard PMU, detect when the ultracapacitor has been drained of power and switch to the battery as a power source during standby mode.

7. The information handling system of claim 1 further comprising:
   the first key operatively coupled to the piezoelectric energy harvester device via a push block that flexes a piezo-electric portion of the piezoelectric energy harvester when the first key is actuated by a user.

8. A method of operating a wireless keyboard operatively coupled to an information handling system comprising:
   with a piezoelectric energy harvester device operatively coupled to a wireless keyboard PMU and placed under a key formed on the wireless keyboard, actuating the key and charging an ultracapacitor operatively coupled to the wireless keyboard PMU when a user actuates the key;
   detecting with the wireless keyboard microcontroller when a threshold period of time has expired since a user has last actuated a key on the wireless keyboard based on keyboard engagement data received from a wireless keyboard microcontroller and placing the wireless keyboard in a standby mode and the wireless keyboard PMU to power the wireless keyboard with the ultracapacitor instead of a battery in standby mode, wherein the wireless keyboard PMU switches between the battery and the ultracapacitor to power the wireless keyboard, and
   detecting with the wireless keyboard microcontroller when a key on the wireless keyboard is actuated based on input from an actuation/engagement sensor, providing keyboard engagement data to the wireless keyboard microcontroller to switch a power source for the wireless keyboard with the wireless keyboard PMU from the ultracapacitor to a battery.

9. The method of claim 8 wherein the key is the space key on the wireless keyboard.

10. The method of claim 8 further comprising:

detecting the presence of the user of the keyboard with a proximity sensor formed in a housing of the wireless keyboard operatively coupled to keyboard actuation/engagement agent, as the keyboard engagement data provided to the wireless keyboard microcontroller.

11. The method of claim 8 further comprising:

flexing of the piezoelectric energy harvester device formed under the key to cause a charge to be provided at the ultracapacitor via a changing circuit to charge the ultracapacitor by actuation of the key during typing.

12. The method of claim 8 further comprising:

detecting, at the wireless keyboard PMU, when the ultracapacitor has been drained of power and switching to the battery as a power source during standby mode.

13. The method of claim 8 further comprising:

flexing the piezoelectric energy harvester device via a push block coupled to the piezoelectric energy harvester device that engages the key and forces the piezoelectric energy harvester to flex when the key is actuated by a user.

14. A wireless keyboard comprising:

a wireless keyboard microcontroller;

a wireless keyboard radio to wirelessly communicate with a host information handling system;

a power management unit (PMU) to provide power to the wireless keyboard microcontroller and the wireless keyboard radio, the wireless keyboard PMU operatively coupled to a battery and an ultracapacitor, wherein the wireless keyboard PMU switches between the battery and the ultracapacitor to power the wireless keyboard;

a piezoelectric energy harvester device having a fixed end and a displaceable end of a piezoelectric material diveboard structure operatively coupled to the ultracapacitor and placed under a first key formed on the wireless keyboard to charge the ultracapacitor when the first key is actuated by a user, where the displaceable end of the piezoelectric material diveboard structure is flexed with actuation of the first key;

the wireless keyboard microcontroller, to determine when a threshold time period has expired since a user has last actuated a key on keyboard based on the keyboard engagement data received to the wireless keyboard microcontroller and place the wireless keyboard in a standby mode and the wireless keyboard PMU to switch power to the ultracapacitor from the battery in the standby mode; and the wireless keyboard microcontroller to detect when a key on the wireless keyboard is actuated based on input from an actuation/engagement sensor and provide keyboard engagement data to the wireless keyboard microcontroller indicating presence of the user to switch power from the ultracapacitor to the battery.

15. The wireless keyboard of claim 14 further comprising:

a proximity sensor formed in a housing of the wireless keyboard operatively coupled to keyboard actuation/engagement agent to detect the presence of the user of the keyboard as the keyboard engagement data provided to the wireless keyboard microcontroller.

16. The wireless keyboard of claim 14, wherein flexing of the piezoelectric material diveboard structure formed under the first key causes a charge to be provided via a charge circuit at the ultracapacitor to charge the ultracapacitor when the first key is actuated.

17. The wireless keyboard of claim 14 further comprising:

the wireless keyboard microcontroller to, via the wireless keyboard PMU, detect when the ultracapacitor has been drained of power and switch to the battery as a power source during standby mode.

18. The wireless keyboard of claim 14 further comprising:

the key operatively coupled to piezoelectric energy harvester via a push block that forces the piezoelectric material diveboard structures to flex downward when the key is actuated by a user.

19. The wireless keyboard of claim 14 wherein the key is a space bar on the wireless keyboard.

20. The wireless keyboard of claim 14 further comprising:

a plurality of piezoelectric energy harvester devices placed under a plurality of keys of the wireless keyboard, each piezoelectric energy harvester operatively coupled to the ultracapacitor to charge the ultracapacitor when the plurality of keys are actuated by a user.

\* \* \* \* \*